United States Patent [19]
Crates et al.

[11] Patent Number: 5,201,495
[45] Date of Patent: Apr. 13, 1993

[54] FISH TAPE REEL AND REEL ASSEMBLY

[75] Inventors: Thomas B. Crates; Donald N. Hesprich, both of Charlotte, N.C.

[73] Assignee: Jameson Corporation, Charlotte, N.C.

[21] Appl. No.: 870,409

[22] Filed: Apr. 17, 1992

Related U.S. Application Data

[63] Continuation of Ser. No. 703,798, May 21, 1991, Pat. No. 5,106,056.

[51] Int. Cl.⁵ .............................................. H02G 1/08
[52] U.S. Cl. .............................. 254/134.3 FT; 242/96; 220/553
[58] Field of Search ............... 254/134.3 R, 134.3 FT, 254/134.4; 242/96; 220/553

[56] References Cited

U.S. PATENT DOCUMENTS

| | | | |
|---|---|---|---|
| 2,689,709 | 9/1954 | Waldschmidt | 254/134.3 FT |
| 3,053,472 | 9/1962 | Stewart | 254/134.3 FT |
| 4,092,780 | 6/1978 | Trethewey et al. | 254/134.3 FT |
| 5,106,056 | 4/1992 | Crates et al. | 254/134.3 FT |

Primary Examiner—Bruce M. Kisliuk
Assistant Examiner—Eileen P. Morgan
Attorney, Agent, or Firm—W. Thad Adams, III

[57] ABSTRACT

A fish tape reel which includes first and second hollow annular reel segments mated together to define a fish tape reel having an enclosed annular fish tape compartment for receiving a lenth of coiled fish tape. The reel defines first and second spaced-apart and opposing side walls and inner and outer spaced-apart and opposing peripheral walls. The inner peripheral wall defines a through void in the reel. A port is provided in the inner peripheral wall of the reel for extending and retracting therethrough a length of fish tape contained in the compartment.

8 Claims, 4 Drawing Sheets

FISH TAPE REEL AND REEL ASSEMBLY

This application is a continuation application of U.S. Ser. No. 703,798 filed May 21, 1991, now U.S. Pat. No. 5,106,056.

TECHNICAL FIELD AND BACKGROUND OF THE INVENTION

This invention relates to a fish tape reel of the type used to fish electrical and telephone cable through conduit. The fish tape is generally made of steel or fiberglass. Several types of fish tape reels are known. One type, exemplified by U.S. Pat. No. 4,092,780 discloses for use in an electrical fish tape reel assembly which includes a generally annular tape-receiving chamber peripherally bounded by a pair of axially opposed lips adapted to separate to permit winding and unwinding of a fish tape in the chamber. A tape winder is mounted between the lips so as to project outside of the reel o its outer wall and constructed to be moved peripherally around the reel between the lips. A tape passage through the tape winder permits passage of the tape. A handle is provided for holding the reel. The tape passage directed outwardly through the winder at an oblique angle to the radius of the reel and extends through the counter chamber for passage of the tape the tape passage including an inlet passage on the inside of the winder and an outlet passage on the outside thereof spaced from each other to provide an aligned rectilinear path for a free span of tape in the counter chamber. As the handle is moved around the periphery of the reel, the lips spread to permit passage of the tape. Such a product is made by Ideal Industries.

Another reel uses two solid pie pan-shaped shells attached together to form an inner compartment within which the fish tape is contained. A hole in one of the shells permits the fish tape to be pulled from and into the compartment. The hole is positioned on one of the major sides of the reel. Such a reel is made by Lancier Inc.

The prior art design which permits the lips of the reel to spread to permit the fish tape to exit is relatively complicated, since it also includes a handle with a lock on it which is subject to breakage and wear. The tape is manipulated on the outer peripheral wall of the reel, exposing it to damage such as from dropping or other heavy impact. Since the lips of the reel are always open at some point on the outer peripheral wall of the reel, dirt and other contaminants can easily enter, causing additional wear as well as greater friction making the tape more difficult to extend and retract.

The prior art design which extends the fish tape through the side wall is simpler to operate, but also exposes the tape to damage, since it is exposed on one of the major surfaces of the reel. Another disadvantage of this design is that it is not "ambidextrous." This means simply that tape may not be fed from the reel to either side. Thus, care must be taken to correctly orient the reel side-to-side or top-to-bottom.

Because of safety considerations fiberglass tapes are now commonly used in place of steel because of their non-conductivity of electricity. Fiberglass tapes are more prone to breakage and must be repaired by splicing the tape. No known prior art fish tape reel provides a convenient place for storing small tools, tubes of adhesive and similar accessories typically used to repair in the field broken fiberglass fish tapes.

The design shown described in this application and claimed in the claims provides a means of protecting the fish tape from breakage and damage, is ambidextrous, and provides a convenient means of storing small tools, tubes of adhesive and similar accessories typically used to repair in the field broken fiberglass fish tapes.

SUMMARY OF THE INVENTION

Therefore, it is an object of the invention to provide a fish tape reel which includes first and second hollow annular reel segments mated together to define a fish tape reel having an enclosed annular fish tape compartment for receiving a length of coiled fish tape. The reel defines first and second spaced-apart and opposing side walls and inner and outer spaced-apart and opposing peripheral walls. The inner peripheral wall defines a through void in the reel. Fish tape access means are provided in the inner peripheral wall of the reel for extending and retracting therethrough a length of fish tape contained in the compartment.

According to one preferred embodiment of the invention, the peripheral wall of one of the first and second reel segments is slightly greater in diameter than the other of the first and second reel segments and the first and second reel segments are releasably mated together by a lap joint.

According to another preferred embodiment of the invention, the fish tape access means comprises a fish tape feeding port communicating with the inner peripheral wall of the reel.

According to yet another preferred embodiment of the invention, the fish tape access means comprises a fish tape feeding port housing positioned on the inner peripheral wall of the reel. The port housing has a substantially radially extending wall thereon with a fish tape feeding port therein for feeding fish tape therethrough tangent to the inner peripheral wall of the reel.

Preferably, a replaceable wear-reducing grommet is positioned in the feeding port.

According to one preferred embodiment of the invention, a storage compartment for small tools and fish tape repair accessories is positioned in the void defined by the inner peripheral wall of the reel.

Preferably, the storage compartment comprises a bottom wall and side walls integrally formed with at least one of the first or second reel segments and a lid mounted on at least one of the first or second reel segments for opening and closing movement relative to the bottom wall and side walls.

According to one preferred embodiment of the invention, the fish tape reel includes a first and second hollow annular reel segments mated together to define a fish tape reel having an enclosed annular fish tape compartment for receiving a length of coiled fish tape. The reel defines first and second spaced-apart and opposing side walls, and inner and outer spaced-apart and opposing peripheral walls. The inner peripheral wall define a through void in the reel. Fish tape access means are provided in the inner peripheral wall of the reel for extending and retracting therethrough a length of fish tape contained in the compartment. A fish tape magazine is positioned in the enclosed annular fish tape compartment for holding a length of coiled fish tape. A length of fish tape is coiled onto the fish tape magazine.

Preferably, the fish tape magazine comprises an annular outer wall and integrally-formed opposing side walls defining an outwardly facing fish tape receiving channel.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Figure 1:
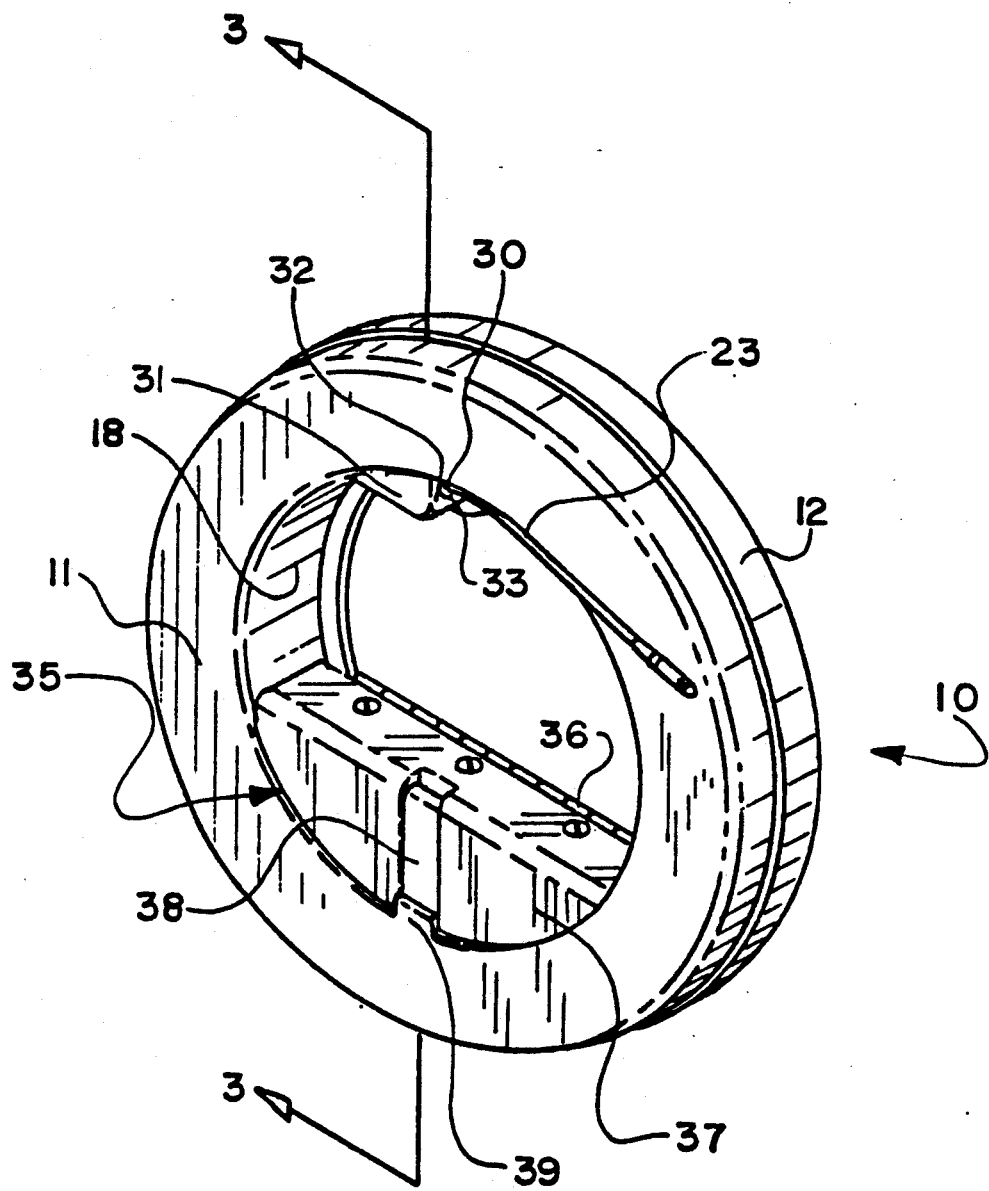
FIG. 1 is a perspective view of a fish tape reel according to a preferred embodiment of the invention.
Figure 2:
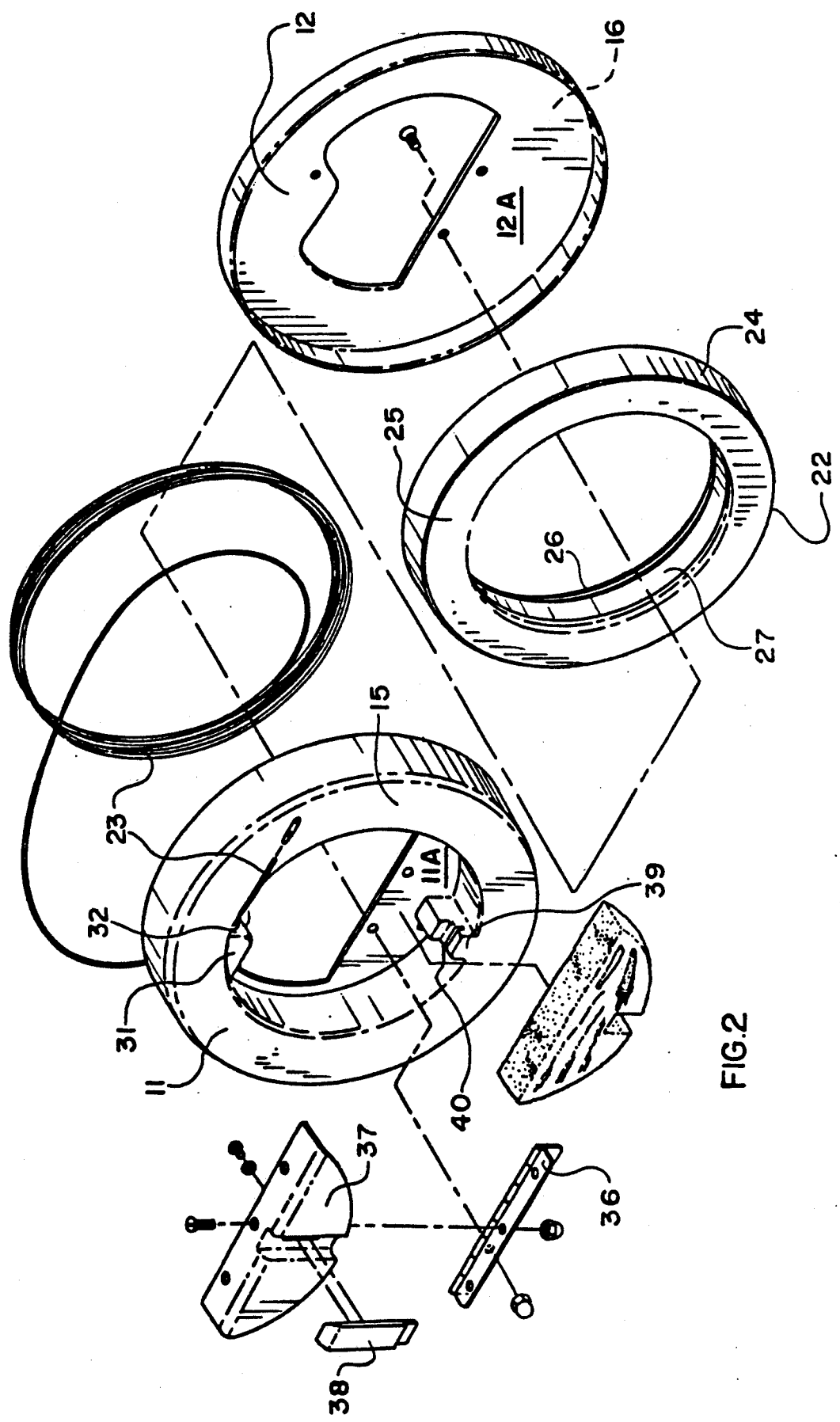
FIG. 2 is an exploded perspective view of the fish tape reel shown in FIG. 1.
Figure 5:
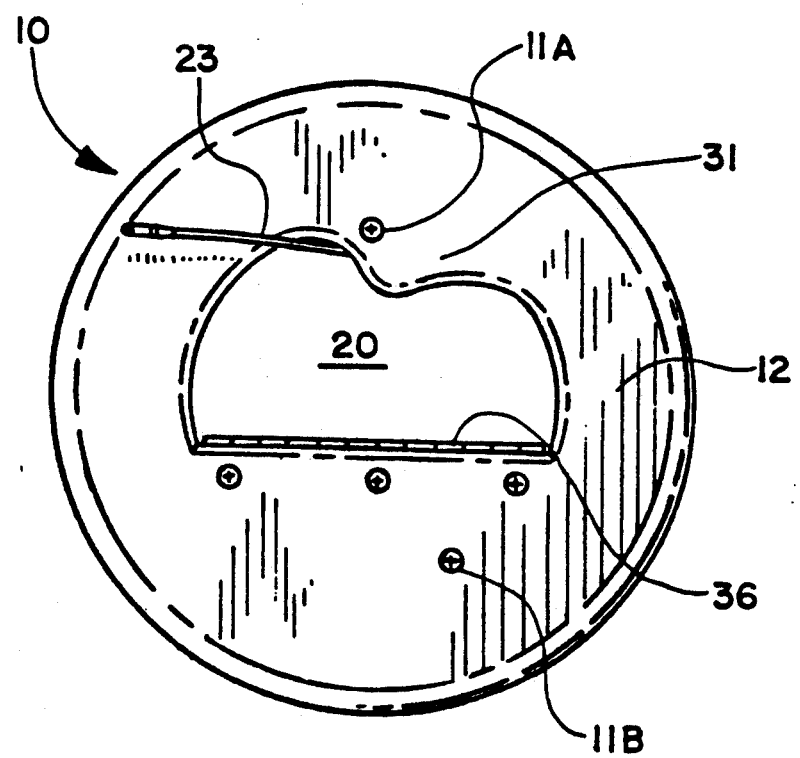

Referring now specifically to the drawings, a fish tape reel assembly according to the present invention is illustrated in FIG. 1 and shown generally at reference numeral 10. As is best shown in FIGS. 1 and 2, first and second hollow annular reel segments 11 and 12 formed of impact resistant ABS plastic are mated together in overlapping relation to form an internal annular tape compartment 14. The reel segments 11 and 12 are releasably secured together by respective nuts and bolts extended through mating holes IIA, 11b. See FIG. 5. The center portion of the reel segments 1 and 12 are open.

Figure 3:
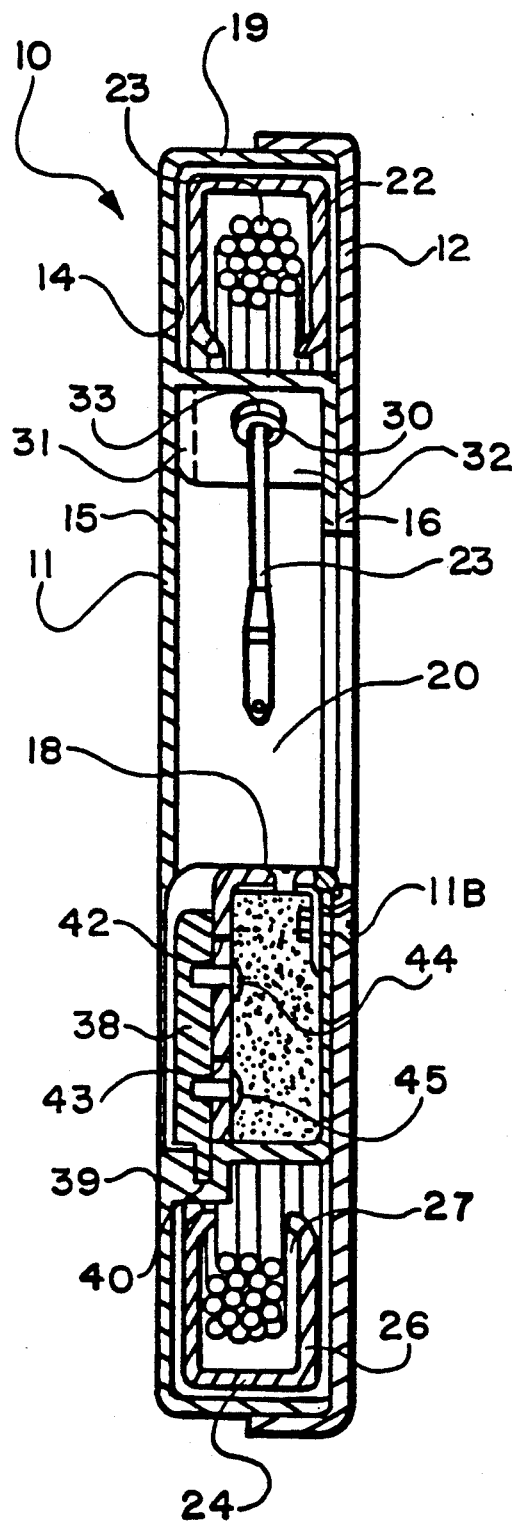
FIG. 3 is a cross-section taken along line 3—3 of FIG. 1.

As is best shown in FIG. 3, segments 11 and 12 of reel 10 define first and second spaced-apart and opposing side walls 15 and 16. These side walls 15, 16 are substantially flat. Segments 11 and 12 also define inner and outer spaced-apart and opposing peripheral walls 18, 19 which define inner and outer circumferences of the reel 10. The inner peripheral wall 19 defines a through void 20 in reel 10. This void 20 in reel 10 permits it to function as a handle and permits it to be easily carried.

As is shown in FIG. 2, a magazine 22 constructed of a suitable plastic material, for example, polystyrene, holds a coil of fish tape 23. Magazine 22 has an annular outer wall 24 and integrally-formed opposing side walls 25 and 26 defining a central, inwardly facing channel 27. The plastic material is selected to provide high impact strength and light weight. The magazine 22 is shown in profile in FIG. 3. Magazine 22 is slightly smaller in width that the tape compartment of reel 10 and thus slides easily within the compartment as the tape 23 is extended from and retracted into reel 10.

Figure 4:
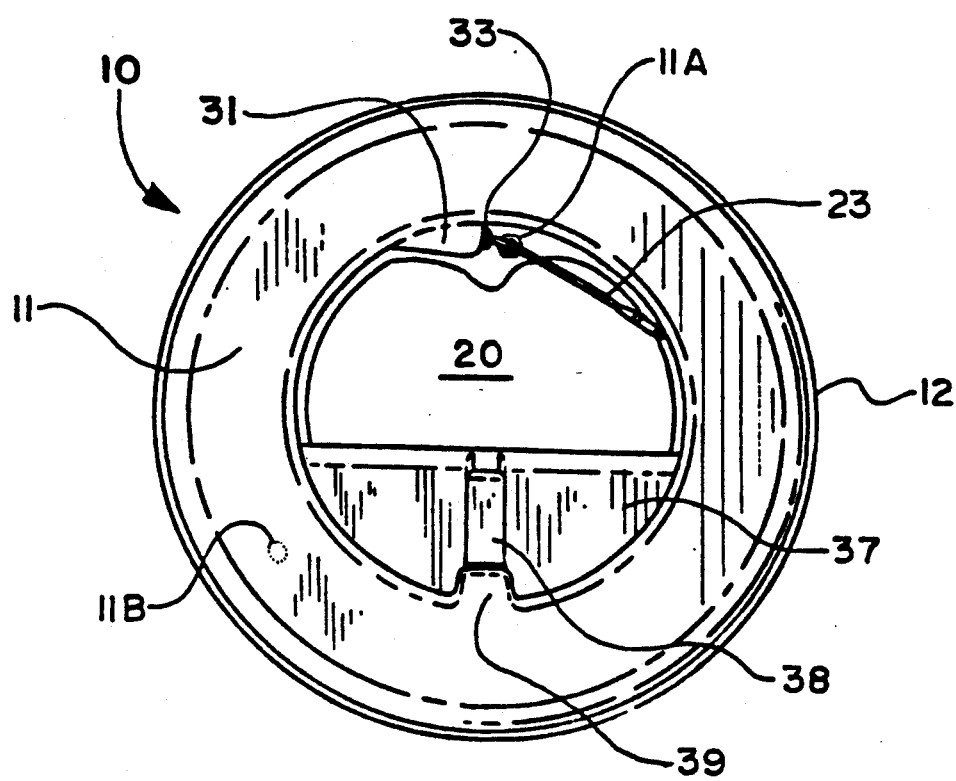
FIGS. 4 and 5 are plan views of both sides of the fish tape reel illustrating how the fish tape may be manipulated from either side.

The tape 23 is protected against damage and breakage by placing a feeding port 30 on the inner peripheral wall 18. As is best shown in FIG. 4, a port housing 31 is integrally formed into the inner peripheral wall 18 of the reel 10. The port housing 31 has a substantially radially extending wall 32 through which the feeding port 30 extends. The tape 23 is thereby required to bend only slightly as it passes off of the magazine 22 and through feeding port 30 tangent to the inner peripheral wall 18 of the reel. A replaceable grommet 33 provides a low friction bearing surface for the fish tape 23.

Since the feeding port 30 resides on the inner peripheral wall 18, it is protected from damage while at the same time being ambidextrous, i.e., the fish tape 23 can pass to either side of the reel a desired.

Referring now to FIG. 2, reel segments 12 and 13 include respective web portions 12A and 13A which, when mated together, form the bottom wall of a storage compartment 35. The inner peripheral wall 18 of reel 10 forms the side walls of the storage compartment 35. A sponge-like pad 50 is positioned within the storage compartment 35 and configured to its shape for holding tools, accessories, or replacement parts in a secured position. The storage compartment 35 is enclosed by attaching a hinge 36 to the mated webs 12A, 13A. Hinge 36 carries a lid 37 which pivots between a closed position, as shown in FIGS. 1, 3 and 4, and an open position which exposes the interior of the compartment.

A latch 38 is mounted for sliding movement between an open position which releases the lid 37 and a closed position which fastens the lid 38 in its closed position. The closed position is maintained by a detent 39 integrally formed in the inner peripheral wall 18. A cut-out 40 in the detent 39 receives the outer end of the latch 38 when the lid 37 is closed. The lower end 41 of the detent 39 supports the latch 38 and the lid 37 in proper spacing above the bottom wall of the compartment 35. The latch 38 is held to the lid by and slides along a pair of slots 42, 43 in lid 38 by screws 44, 45.

The construction described above provides a reel which is simple to construct and easy to use. It overcomes many of the problems associated with prior art devices.

A fish tape reel is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. A fish tape reel, comprising:

(a) first and second hollow annular reel segments mated together to define a fish tape reel having an enclosed annular fish tape compartment for receiving a length of coiled fish tape;

(b) said reel defining first and second spaced-apart and opposing side walls, and inner and outer spaced-apart and opposing peripheral walls, said inner peripheral wall defining a through void in said reel;

(c) fish tape access means in the inner peripheral wall of the reel for extending and retracting therethrough a length of fish tape contained in the compartment;

(d) storage compartment means positioned in the void in said reel, said storage compartment comprising first compartment wall means substantially flush with one of said first or second side walls, second compartment wall means spaced-apart from said first compartment wall means to define a storage space therebetween, said second compartment wall means being substantially flush with the other of said first or second side walls, hinge means cooperating with said first and second compartment side walls to permit hinged movement of one of the compartment side walls relative to the other, and fastener means for securing the storage compartment in a closed position.

2. A fish tape reel according to claim 1, wherein said storage compartment has a first, arc-shaped peripheral wall segment and a second, straight peripheral wall segment.

3. A fish tape reel according to claim 1, wherein at least one of the side walls of said storage compartment is integrally formed with one or the other of said first or second annular reel segments.

4. A fish tape reel according to claim 1, wherein at least one of the side walls of said storage compartment is detachable secured to one or the other of said first or second annular reel segments.

5. A fish tape reel according to claim 1, wherein said void comprises a hand-hold for carrying the fish tape reel.

6. A fish tape reel according to claim 1, wherein the outer peripheral wall of one of said first and second reel segments is slightly greater in diameter than the other of the first and second reel segments and said first and second reel segments are releasably mated together by a lap joint.

7. A fish tape reel according to claim 1, wherein said fish tape access means comprises a fish tape feeding port communicating with the inner peripheral wall of the reel.

8. A fish tape reel according to claim 1, wherein said fish tape access means comprises a fish tape feeding port housing positioned on the inner peripheral wall of the reel, said port housing having a substantially radially extending wall thereon with a fish tape feeding port therein for feeding fish tape therethrough tangent to the inner peripheral wall of the reel.

* * * * *